United States Patent [19]

King

[11] 3,821,948
[45] July 2, 1974

[54] SYSTEM AND METHOD FOR ANALYZING ABSOLUTE DERIVATIVE SIGNAL FROM HEARTBEAT

[75] Inventor: Eugene King, Yardley, Pa.

[73] Assignee: Hoffmann-La Roche Inc., Nutley, N.J.

[22] Filed: Nov. 3, 1971

[21] Appl. No.: 195,396

[52] U.S. Cl............................................ 128/2.06 A
[51] Int. Cl............................................ A61b 5/04
[58] Field of Search ..... 128/2.06 A, 2.06 F, 2.06 R, 128/2.05 P, 2.05 R, 2.05 T; 307/235

[56] References Cited
UNITED STATES PATENTS

| | | | |
|---|---|---|---|
| 3,174,478 | 3/1965 | Kahn | 128/2.06 F |
| 3,438,367 | 4/1969 | Karsh et al. | 128/2.06 A |
| 3,524,442 | 8/1970 | Horth | 128/2.06 A |
| 3,593,705 | 7/1971 | Thomas | 128/2.06 A |
| 3,602,222 | 8/1971 | Herndon | 128/2.06 F |
| 3,654,916 | 4/1972 | Neilson | 128/2.06 A |

*Primary Examiner*—William E. Kamm
*Attorney, Agent, or Firm*—Samuel L. Welt; Bernard S. Leon

[57] ABSTRACT

An arrhythmia detection system for analyzing electrocardiographic signals comprising transforming a filtered, absolute, derivative of the electrocardiographic signals into a first integral signal defining an adaptive threshold level and depending from prior heart beat signals, transforming the electrocardiographic signals into a second integral signal representative of a heart beat virtually independent from prior heart beat signals, and comparing the levels of the first and second integral signals for generating a QRS trigger pulse. Further aspects include providing a third integral signal accentuating noise and comparing its level with the first integral signal level for inhibiting QRS trigger signals during noise occurrence.

10 Claims, 10 Drawing Figures

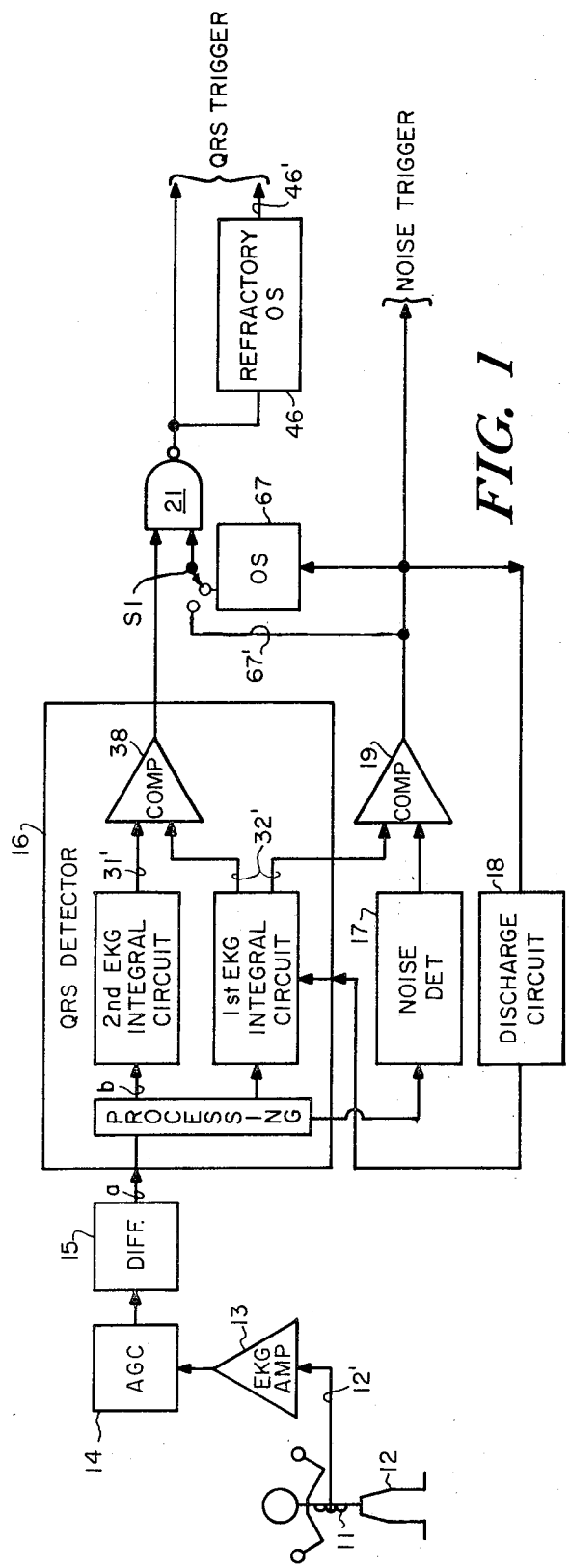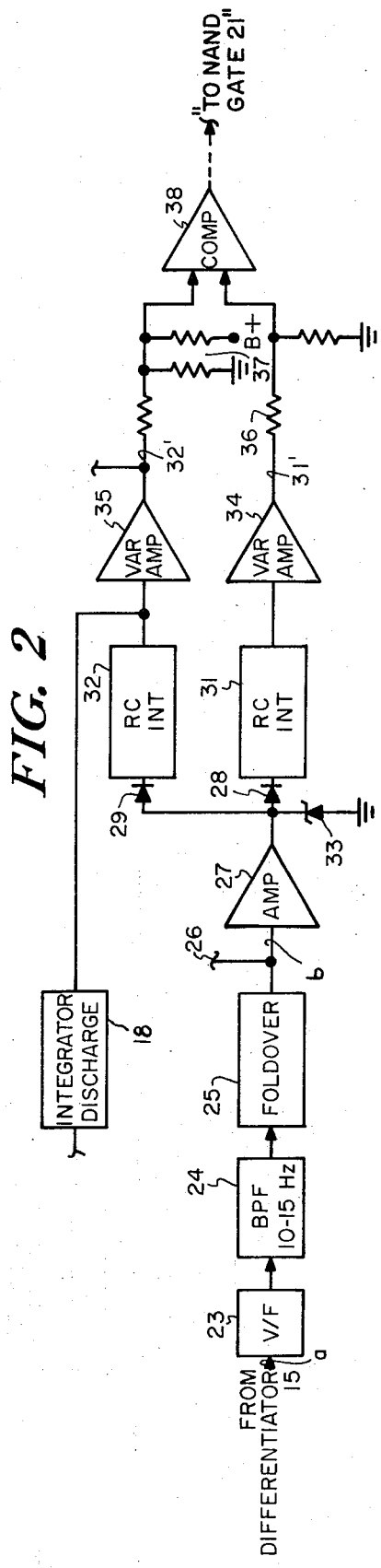

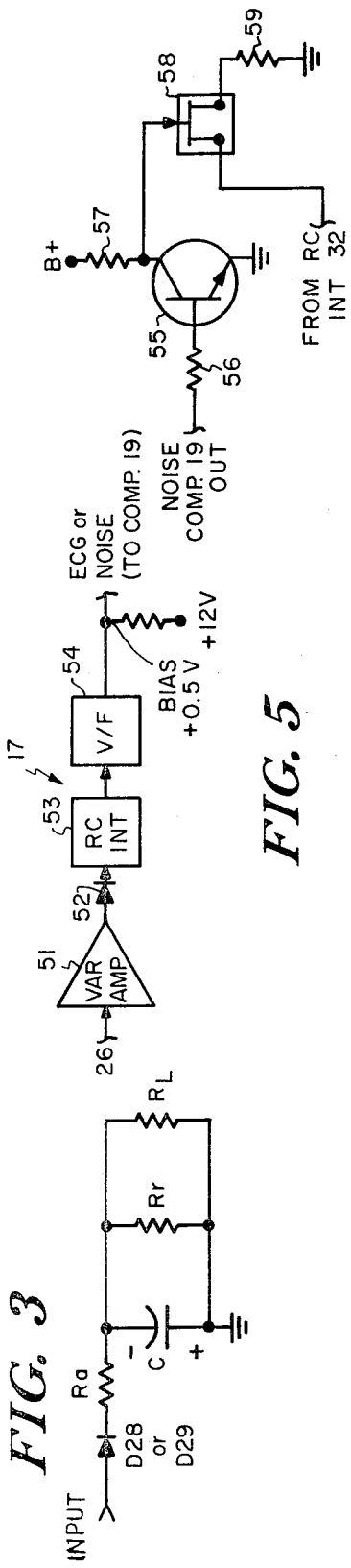
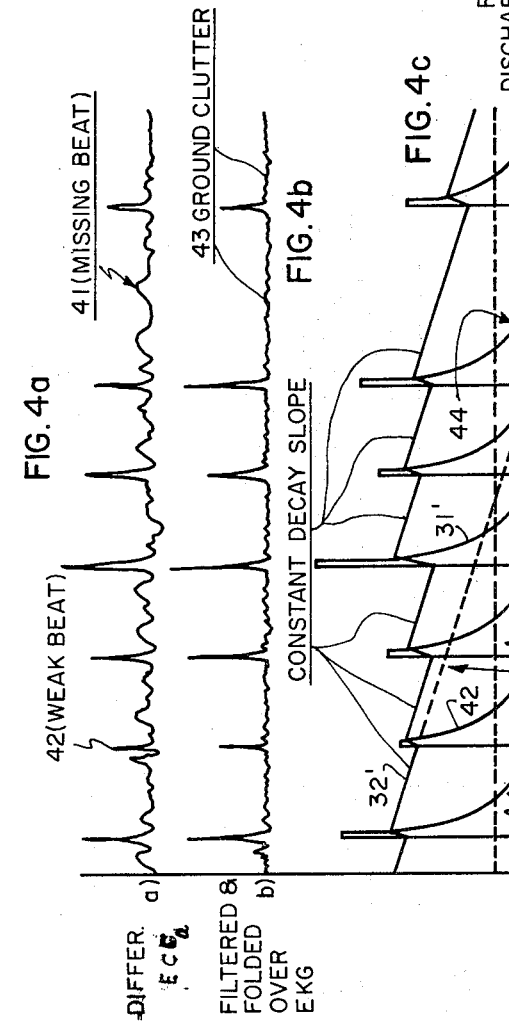
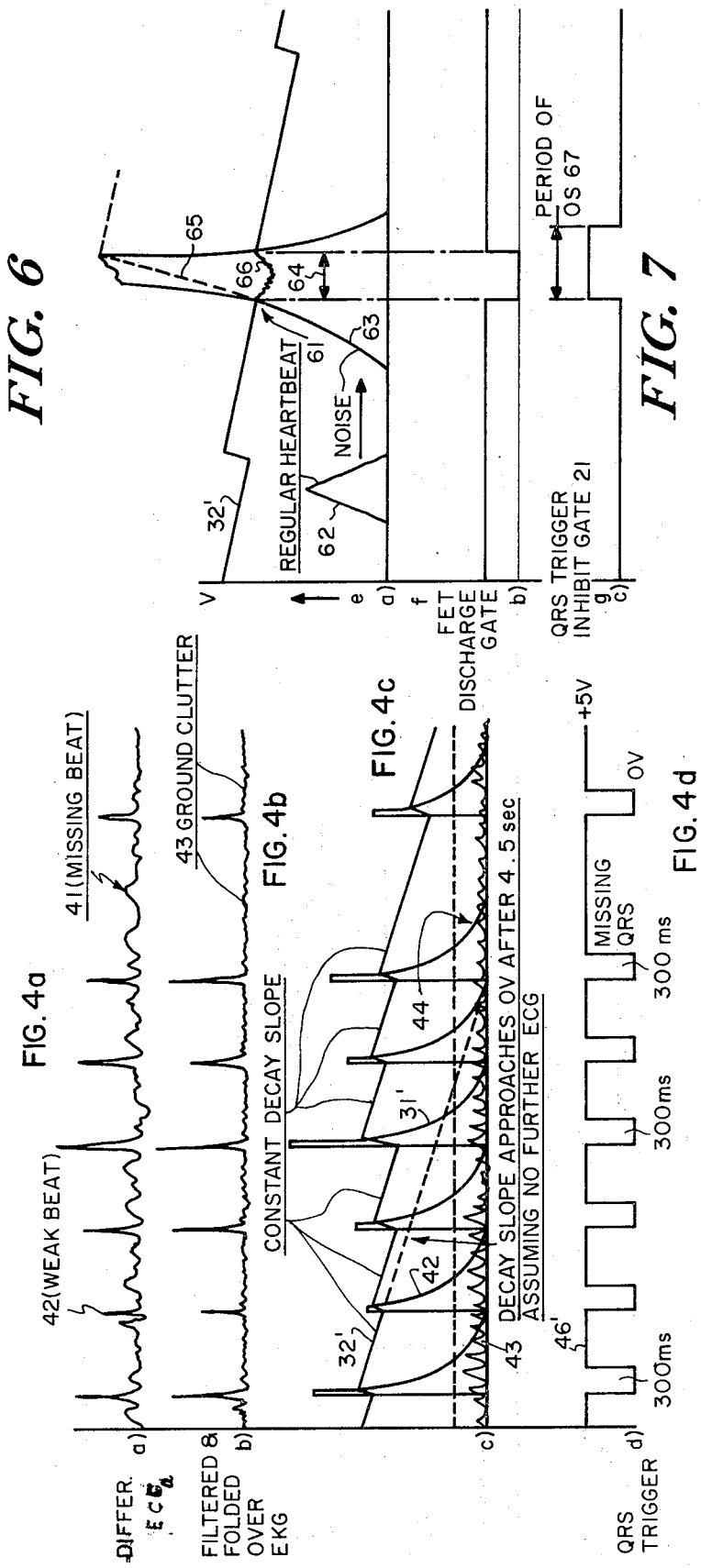

SYSTEM AND METHOD FOR ANALYZING ABSOLUTE DERIVATIVE SIGNAL FROM HEARTBEAT

BACKGROUND OF THE INVENTION

1. Field of the Invention

This invention relates to a method and apparatus for detecting the heart activity of patients as indicated by recurrent electrocardiac signals representing heart activity information, and more particularly an improved arrhythmia detecting technique for automatically and accurately responding to distinguishing characteristics of the EKG waveform.

2. Description of the Prior Art

The electrocardiogram (EKG) is the priming signal in he majority of monitoring and in all coronary care systems. Most systems also identify the QRS complex of the electrocardiogram with a "QRS trigger" which is used for a variety of purposes in medical devices, including for example, its use as a timing reference for developing heart rate data, an R—R interval histogram, etc. In many cases, heart rate alarm circuitry is utilized to alert personnel to ventricular fibrillation or cardiac standstill. Accordingly, it is imperative that the EKG be accurately monitored as lives depend on the quality of the monitoring capability. The QRS trigger circuit contained within heart monitoring equipment is, to a large degree, determinative of the quality of the monitoring capability. These circuits in commerical use typically are analogue systems which rectify to count waves of different polarity, filter to eliminate noise and accentuate the EKG, and threshold on the processed signal to initiate a pulse indicating a QRS.

One problem encountered in these devices is the lack of an automatic threshold which quickly and accurately adapts to the patient's changing morphology. As a result of the varying conditions in changing morphology, which are experienced with the detection of heart activity signals, other problems exist in providing for adequate QRS trigger circuits. One such problem is the existence of noise along with the heart activity signal such as electrode noise, high frequency noise, pacemaker noise, etc...., whereby the noise may confuse the trigger circuit causing an inordinate number of false alarms to, in effect, dilute the efficacy of the system.

Another problem experienced with the detection of heart activity signals is introduced by the remarkable variance in amplitude and shape of the QRS waveforms, from beat to beat, to the extent that normally low level T waves will have large amplitudes and high frequency content. Such changes in the QRS complex may cause the circuit to fail to identify waves and the abnormal T waves may be counted as QRS causing a false high heart rate. These marked amplitude changes may further confuse automatic circuits because the reset threshold, which takes time to return to its original level once the abnormal T waves have faded away, will fail to notice smaller QRS waves. Yet another problem stems from the rate meters and alarms operating on an average rate, whereby as a result of erratic response to flutter-fibrillation, because of similarity in amplitude and frequency content to pre-existing waves, several seconds or even minutes might be lost before the event is alarmed.

SUMMARY

Accordingly, it is the purpose of the present invention to provide an adaptive, reliable, noise rejecting QRS trigger circuit and system for monitoring heart rhythm. The above is achieved by provision of an on-line real time threshold signal which is instantaneously adaptive to changes in magnitude of the heart activity signal received. In the embodiment disclosed, an automatic threshold signal is developed by integration with a relatively long attack and release time constant, of the incoming heart activity signal, and then compared against a second automatic threshold signal developed by integration with a relatively fast attack and release time constant, of the incoming heart activity signal.

In a further aspect of the invention, a third automatic threshold signal is developed by integration, with a relatively fast time constant, of the incoming heart activity signal, for elimination of fast transient interfering type noise.

BRIEF DESCRIPTION OF THE DRAWINGS

FIG. 1 is an overall schematic block diagram of the arrhythmia detection system of the present invention.

FIG. 2 is a schematic block diagram including the QRS detector circuitry illustrated in FIG. 1.

FIG. 3 is a typical circuit diagram of integrator circuits 31 and 32.

FIGS. 4a – 4d show a series of time related voltage waveforms showing time current voltages at the corresponding points indicated in FIGS. 1 and 2.

FIG. 5 represents a schematic block diagram of noise detector 17 in FIG. 1.

FIG. 6 illustrates a circuit diagram of the discharge circuit 18 shown in FIG. 1.

FIG. 7 shows a series of time related voltage waveforms showing time variant voltages given certain conditions of high frequency noise included in the incoming heat signal.

DESCRIPTION OF THE PREFERRED EMBODIMENT

Referring now to FIG. 1, there is shown a general outline of the system encompassing the present invention, wherein a pickup electrodes 11 attached to patient 12 provide an electrocardiac signal via a connecting cable 12' to a front-end EKG pre-amplifier 13 which is connected to an AGC unit 14 for holding down the dynamic range of a patient's EKG to a steady level. It should be noted that conventional AGC units of the type represented by 14 are normally not fast enough to catch some EKG fadings during an EKG patient run and do not react to sudden increase in EKG amplitude. The AGC unit 14, in turn, is coupled to a differentiator 15 for differentiation of the EKG signal to emphasize signals with sharper slopes thereby eliminating T wave and P wave information, thereby contributing to a more effective decision making capability.

The output of differentiator 15 is connected to a QRS detector 16 which is to be later described in detail. QRS detector 16 includes a processing circuit and a first and second transforming circuits for integrating the EKG signal into first and second signal levels which are then compared to provide a QRS trigger output. A noise detector is connected from the processing circuit, and its output is connected for comparison with a first one of the two EKG signal transforming circuits of the QRS detector 16 via comparator 19, to provide a noise trigger signal, which may be introduced by way of a one shot unit 67, to inhibit the output of NAND gate 21 which is also connected from the output of the QRS detector 16. The comparator 19 output is connected to a discharge circuit 18 which in turn is connected back to the first one of the signal levels developed. As illustrated, signal outputs from NAND gate 21 will be indicative of a QRS trigger signal.

QRS DETECTOR

As illustrated in FIGS. 1 and 2, the EKG differentiated waveform is connected to processing circuitry including a voltage follower 23 which functions as a voltage isolator to prevent loading down of differentiator 15 (see FIG. 1), by having a high input impedance. The voltage follower 23 is coupled to a narrow bandpass filter (BPF) 24 with a 3-db bandwidth of approximately 10 to 15 Hz with 24 db per octave slopes, so as to completely remove low frequency clutter around 5 to 8 cps and lower which clutter might otherwise cause noise triggering during EKG signal fading. This 10 to 15 cps window, which would also remove any pacemaker signal which might be present, was found, after extensive study and clinical testing, to be a suitable and nonambiguous monitoring range for a large variety of EKG morphology. A foldover unit 25 is connected from BPF 24, serving as a full wave rectifier to accommodate bipolar signals. Connected to the output of foldover 25 is an amplifier 27 which acts as a driver as the 10 to 15 cps QRS signals are very weak. A tap-off terminal 26 is provided as the lead between foldover 25 and amplifier 27 for the noise detector circuit to be later described.

Amplifier 27 is separately coupled via low leakage diodes 28 and 29 to RC integrators 31 and 32 respectively, and is additionally coupled to ground via zener diode 33. One form of integrators 31 and 32, is depicted in FIG. 3 where the values of attack resistance Ra, release resistance Rr, and capacitance C are such to provide: integrator 32 with a relatively long attack time and relatively long release time, and; integrator 31 with a relatively fast attack time and relatively fast release time. Each of the integrators 31 and 32 are connected to respectively drive variable amplifiers 34 and 35. Each of the variable amplifiers are then coupled through impedances 36 and 37 respectively, to the dual inputs of a comparator unit 38. A 300 ms one shot trigger unit 46 is connected via NAND gate 21 from the comparator unit 38. An example of typical RC values for integrators 31 and 32 is shown below:

|  | Ra | C | Rr |
|---|---|---|---|
| Integrator 31 | 100 ohms | 5.5 μf | 22 K |
| Integrator 32 | 68.4 K | 5.5 μf | 510 K |

The low leakage diodes D28 and D29 allow integration of positive signal levels only and prevent leakage back to the drive amplifier 27. With its high impedance lead $R_L$, representing the high input impedance of variable amplifiers 34 or 35, the integrator of FIG. 3 is a true integrator.

Values such as those shown above would provide: integrator 31 with a fast attack time constant or period of about 0.6 ms and a release time constant of about 120 ms, and; provide integrator 32 with a slow attack period of about 375 ms and a slow release period of 1.5 seconds. It is, of course, understood that a large number of permutations and combinations of attack periods and release periods would be suitable in operation of the present invention. For instance one combination might include a tolerance range of at least 2:1 for each attack and release time constant.

The action of the integrated units might be best explained with reference to FIG. 4 where at FIGS. 4a – 4d, the waveform represents a raw EKG differentiated signal from differentiator 15 depicting a missing beat at 41 and a weak EKG beat at 42. The filtered absolute, derivative signal output of amplifier 27 is illustrated at FIG. 4b. In FIG. 4c waveforms 31' and 32' represents the comparative actions of integrators 31 and 32 respectively on the filtered absolute derivative EKG signal from amplifier 27.

The relatively long attack time of integrator 32 serves to avoid any automatic change in a threshold level 32' due to noise or clutter surrounding the 10–15 cps window, and its relatively long release time is slow enough to support a meaningful threshold level about most noise signals or ground clutter 43 to virtually prevent triggering by noise spikes exceeding the threshold 32' during bradycardia and missing beat events (such as at 41). Yet, on the other hand the release time is fast enough to respond to react to sudden EKG fadings (e.g., two to four successive missing beats) to indicate an alarm condition. This is achieved by making the release time or decay of signal 32' such that, for example, approximately 4.5 seconds (3–4 normal heart beats) would expire before the waveform 32' would go to zero, thus, in this example making the decay period of threshold 32' suitable for effectively responding to an EKG signal fading occuring in only a third one of three successive heart beat periods. To supplement the above, it has been found expedient to provide the comparator 38 with a DC-offset 44 of approximately 0.5 volts DC to establish a minimum fixed threshold level to which 32' would descend to prevent the automatic threshold level from sinking to ground level. Otherwise, in the case of QRS absence, a response would occur to any small amount of noise.

In contradistinction to the above, the action of integrator 31 on the filtered absolute derivative EKG signal, as is illustrated at FIG. 4c by waveform 31', provides a relatively fast attack time and a fast release time for the reason that with every heart beat the signal, represented by waveform 31', should start from ground level and not depend on or be influenced by the previous heart beat signal. The latter is achieved by selection of approximately anywhere from 80 ms to 120 ms as the release time constant. With 100 ms, for example, it takes about three time constants for the decay of signal 31' to ground level which would amount to 300 ms or approximately the equivalent of 200 beats per minute. Since anything above 150 beats per minute might normally be defined as tachycardia which is an alarm condition, the necesiity for return of the waveform 31' to ground level in these cases is obviated.

The variable amplifier gains 34 and 35 are adjusted for a voltage differential of approximately 2 to 3 volts over a simulated normal test EKG so that penetration of integrated signal 32' by signal 31' assures no trigger loss on very weak QRS signals. This might be illustrated with regard to FIGS. 4a – 4d where at FIG. 4c each of the integrated ECG spikes as well as a weak spike 42, will penetrate the threshold 32' by this minimum prescribed requirement to provide an output pulse at comparator 38 or NAND gate 21 equal to the duration of the penetration. As depicted at FIG. 4d, each time penetration of, for example 5 m volt occurs, a QRS trigger pulse 46' is generated for refractory period of 300 ms by the one shot unit 46 shown in FIG. 1.

NOISE DETECTOR

The noise detection circuitry 17 in the instant system is illustrated with reference to FIG. 5 wherein a variable amplifier 51 is connected via lead 26 from the foldover unit 25 in the processing portion of the QRS detection circuitry shown in FIG. 2. A low leakage diode 52 is connected from amplifier 51 and to integrator 53 having a relatively fast time constant with, for example, an Ra of 100 ohms, a C of 0.47 and a $R_r$ of 150K ohms.

The fast time constant should not penetrate the QRS threshold output of integrator 32 for typical EKG associated noise. However, spikes such as from tapes, pacers, switches or other fast transient interfering types will be accentuated by integrator 32. The integrator 53 is, in turn, connected to a voltage follower 54. With reference back to FIG. 1, the comparator 19 which is connected from the QRS integrator 32 and noise integrator 53 via voltage follower 54, is adjusted to provide the threshold signal 32' with a DC offset (bias) of 0.5 volt to prevent noise triggering in the case of EKG signal drop out. Through the variable amplifier 51 the integrated output from voltage follower 54 may be adjusted to have its gain ride 1 volt below 32' as to normal test EKG.

With reference back to FIG. 1, it may, in some instances, be desirable to use the one shot 67 in lieu of lead 67' to inhibit the as selectable, for example, via a selector switch S1, NAND gate 21, in which case a one shot period of 0.4 second to one second would be practical.

DISCHARGE CIRCUIT

As is illustrated in FIG. 6, the base of a transistor 55 is connected via a resistor 56 from the comparator 19 output. The transistor emitter is grounded and its collector is tied to B+ via resistor 57 and to the gate input of an FET 58 acting as a switch having a very high impedance, such as $10^7$ ohms, across it through resistor 59 to ground thereby preventing any current leakage. In operation, with reference to FIG. 7, as the integrated QRS threshold level 32' is exceeded or penetrated at point 61 by a large noise spike 63, an output signal is generated by comparator 19 to drive switch driver 55 and in turn activating FET 58 to reduce its impedance to less than 200 ohms. With the FET switch in an "on" condition the QRS integrator 32 is discharged during the period 64 of penetration, defining a variable noise inhibit window. Accordingly, the tendency of QRS integrator 32 to charge up as illustrated by 65, due to the spike noise is counterbalanced by the discharge to provide a resultant threshold signal 66.

As is evident, the discharge feature for overcoming or counteracting strong noise signals enables the present invention to better adapt to and more readily reflect the changing morphology of a patient. Otherwise it might take anywhere from 10 to fifteen seconds or heart beats, depending on noise magnitude, to allow the QRS threshold to float down to an average level more indicative of the actual QRS, due to the slow release time of integrator 32.

OPERATION

In turning back to FIGS. 1 and 4a – 4d, the raw EKG signals in FIG. 4a are passed by way of electrodes from a patient 11 and processed through an amplifier 13, AGC unit 14 and differentiator 15. Further processing in the QRS detector 16 provides a filtered, absolute, derivative EKG signal as shown at FIG. 4b, which latter signal is separately integrated by integrators 31 and 32 to provide a first and second integral signals, 31' and 32' respectively, as is illustrated in FIGS. 4a – 4d.

The first one of the integrated signals 31' is conditioned to virtually commence from ground level and not depend from or be influenced by a previous heart beat signal. In contradistinction, the second signal 32' which depends as is influenced by a previous heart beat is designed to accurately adapt to a patient's changing morphology thereby providing an on-line real time threshold signal. By weighing the signals 31', 32' in comparator 38 a signal will be emitted upon penetration of 32' by 31' as depicted at FIG. 4c allowing a QRS trigger signal output.

The QRS trigger is normally passed through a NAND gate 21, however, is inhibited upon the presence of a noise trigger pulse. The latter occurs when a noise pulse output from noise detector 17 will exceed the threshold signal 32' as is illustrated in FIG. 7, in which case comparator 19 is fired to energize a variable noise inhibit window to inhibit NAND gate 21 via lead 67' or if desired via the one shot unit 67 which generates, for example, fixed period inhibition window to inhibit NAND gate 21. Due to the fast attack time constant of noise integrator 53, the noise trigger, if present, always appears prior to the QRS trigger.

Further, to offset the effect of the noise pulses on the adaptive threshold signal 32' a discharge circuit 18 is also energized by comparator 19 during a period of coextensive with the penetration of the signl 32' by the noise. The discharge, in effect, counteracts the surge of voltage fed to integrator 32 due to the noise pulse, thereby enabling signal 32' to maintain its adaptive response to charges in the magnitude of the heart activity signal received.

As is illustrated at FIG. 1, the output QRS trigger from comparator 38 may be employed to activate an one shot 46 having, for example, a refractory period anywhere from a 250 to 300 ms pulse to prevent multiple triggering during a QRS complex. The leading edge of the QRS comparator trigger output fires the refractory one shot 46. The 250 to 300 ms wide QRS trigger could similarly be inhibited by one shot 67 if desired.

I claim:

1. An arrhythmia detection system for analyzing an absolute derivative signal derived from a patient's heartbeat comprising:

first integrator means for generating a first signal representative of the average magnitude of an incoming absolute derivative signal over a plurality of heartbeats;

second integrator means for generating a second signal representative of the magnitude of an incoming absolute derivative signal over a single heartbeat; and comparison means for comparing the magnitude of said first and second signals and generating an output representative of cardiac activity when the second signal magnitude attains a predetermined relationship with respect to the first signal magnitude.

2. The system of claim 1 including narrow filter means for filtering the absolute derivative signal.

3. The system of claim 2 wherein
said narrow filter means is adapted to pass an absolute derivative signal in the range from approximately 10 to 15 cycles.

4. The system of claim 1 including:
third integrator means for selectively providing a third signal accentuating noise associated with said absolute derivative signal; and,
second comparison means for comparing the signal magnitude of said first and third signals and generating an output signal indicative of noise when the third signal magnitude attains a predetermined relationship with respect to the first signal magnitude.

5. The system of claim 4 including:
inhibiting means for inhibiting the output signal of the first comparison means indicative of cardiac activity, at least during the presence of said noise output signal.

6. The system of claim 4 including: discharge means responsive to said noise output signal for rapidly attenuating the first signal at said first integrator means.

7. The system of claim 1 wherein:
said first integrator means is provided with a relatively long attack and release times so as to depend from the signal level of a prior heartbeat signal enabling said first signal to immediately adapt to a patient's changing morphology; and
said second integrator means is provided with a relatively fast attack and release times so as not to be influenced by and thereby be virtually independent of the signal level of a prior heartbeat signal.

8. The system of claim 1 wherein
said second processing means is providing a decay rate to virtually attenuate to ground said second integral signal within 350 milliseconds or less.

9. The system of claim 8 wherein
said first integrator means is provided a decay rate to virtually attenuate to ground the first integral signal within approximately anywhere from 3–4 seconds.

10. A method of analyzing an absolute derivative signal derived from a patient's heartbeat comprising the steps of:
transforming the absolute derivative signal into a first integral signal representative of the average magnitude of an absolute derivative signal over a plurality of heartbeats;
transforming the absolute derivative signal into a second integral signal representative of the magnitude of an absolute derivative signal over a single heartbeat;
comparing the signal magnitude of said first and second integral signals to generate an output cardiac signal when the second integral signal magnitude attains a predetermined relationship with respect to the first integral signal magnitude.

* * * * *